(12) United States Patent
Li

(10) Patent No.: US 10,895,079 B2
(45) Date of Patent: Jan. 19, 2021

(54) DECORATIVE PANEL, PANEL COVERING, AND METHOD OF PRODUCING SUCH A DECORATIVE PANEL

(71) Applicant: Northann Building Solutions LLC, Sacramento, CA (US)

(72) Inventor: Lin Li, Elk Grove, CA (US)

(73) Assignee: Northann Building Solutions LLC, Sacramento, CA (US)

( * ) Notice: Subject to any disclaimer, the term of this patent is extended or adjusted under 35 U.S.C. 154(b) by 0 days.

(21) Appl. No.: 16/392,909

(22) Filed: Apr. 24, 2019

(65) Prior Publication Data
US 2020/0325689 A1 Oct. 15, 2020

(51) Int. Cl.
| | | |
|---|---|---|
| *E04F 15/02* | (2006.01) | |
| *E04F 13/18* | (2006.01) | |
| *E04C 2/54* | (2006.01) | |
| *E04F 13/08* | (2006.01) | |
| *E04F 15/10* | (2006.01) | |
| *B41M 7/00* | (2006.01) | |
| *B41M 3/00* | (2006.01) | |
| *B41M 5/00* | (2006.01) | |

(52) U.S. Cl.
CPC ......... *E04F 15/02038* (2013.01); *B41M 3/00* (2013.01); *B41M 5/0011* (2013.01); *B41M 7/0081* (2013.01); *E04C 2/54* (2013.01); *E04F 13/0871* (2013.01); *E04F 13/0894* (2013.01); *E04F 13/18* (2013.01); *E04F 15/105* (2013.01); *E04F 15/107* (2013.01); *E04F 2201/0153* (2013.01)

(58) Field of Classification Search
CPC ..... E04F 13/0871; E04F 15/107; E04F 13/18; E04F 13/0894; E04F 15/105; E04F 15/02038; E04F 2201/0153; E04C 2/54; B41M 7/0081; B41M 3/00; B41M 5/0011
USPC .......................................................... 52/306
See application file for complete search history.

(56) References Cited

U.S. PATENT DOCUMENTS

| | | | | |
|---|---|---|---|---|
| 4,437,924 | A * | 3/1984 | Weglin | B23P 15/24 156/515 |
| 5,190,804 | A * | 3/1993 | Seto | C04B 41/4961 428/122 |
| 5,798,160 | A * | 8/1998 | Kohn | B32B 3/10 428/56 |
| 9,365,028 | B2 * | 6/2016 | Vogel | E04F 13/08 |
| 10,202,768 | B2 | 2/2019 | Doehring | |
| 2003/0113487 | A1 * | 6/2003 | Lasson | B44C 1/14 428/34.3 |
| 2003/0138617 | A1 | 7/2003 | Courtoy et al. | |

(Continued)

FOREIGN PATENT DOCUMENTS

| | | | |
|---|---|---|---|
| CN | 1803881 A * | 7/2006 | |
| CN | 103306451 A * | 9/2013 | |

(Continued)

*Primary Examiner* — Jeanette E Chapman
(74) *Attorney, Agent, or Firm* — The Webb Law Firm

(57) ABSTRACT

The invention relates to a decorative panel, in particular a floor panel, ceiling panel or wall panel. The invention also relates to a panel covering, such as a floor covering, ceiling covering or wall covering, comprising a plurality of panels according to the invention. The invention further relates to a method of producing a decorative panel according to the invention.

48 Claims, 4 Drawing Sheets

(56) References Cited

U.S. PATENT DOCUMENTS

| | | | |
|---|---|---|---|
| 2007/0231583 A1* | 10/2007 | Ilzuka | B32B 27/42 |
| | | | 428/423.7 |
| 2009/0155612 A1* | 6/2009 | Pervan | B32B 21/02 |
| | | | 428/498 |
| 2009/0260307 A1 | 10/2009 | Thiers | |
| 2017/0001425 A1* | 1/2017 | Gray | B32B 27/08 |
| 2017/0008334 A1* | 1/2017 | Hoff | B44C 5/043 |
| 2017/0297307 A1* | 10/2017 | Shinmyo | E04B 1/942 |
| 2018/0043653 A1* | 2/2018 | Sutou | B32B 3/26 |
| 2018/0238059 A1 | 8/2018 | Thomas | |
| 2018/0244877 A1 | 8/2018 | Miyamoto et al. | |
| 2018/0319192 A1 | 11/2018 | Zhou et al. | |

FOREIGN PATENT DOCUMENTS

| | | |
|---|---|---|
| EP | 1973751 B1 | 4/2014 |
| EP | 2883712 A1 | 6/2015 |
| EP | 3090816 A1 | 11/2016 |
| WO | 2007072198 A2 | 6/2007 |
| WO | 2014202143 A1 | 12/2014 |
| WO | 2017083415 A1 | 5/2017 |
| WO | 2017105404 A1 | 6/2017 |

\* cited by examiner

DECORATIVE PANEL, PANEL COVERING, AND METHOD OF PRODUCING SUCH A DECORATIVE PANEL

CROSS-REFERENCE TO RELATED APPLICATION

This application claims priority to Dutch Patent Application No. 2022925 filed Apr. 11, 2019, the disclosure of which is hereby incorporated by reference in its entirety.

BACKGROUND OF THE INVENTION

Field of the Invention

The invention relates to a decorative panel, in particular a floor panel, ceiling panel or wall panel. The invention also relates to a panel covering, such as a floor covering, ceiling covering or wall covering, comprising a plurality of panels according to the invention. The invention further relates to a method of producing a decorative panel according to the invention.

Description of Related Art

Laminated panels comprise a decorative layer having a decorative pattern which typically has the appearance of a wood pattern. The decorative layer is covered by a transparent layer to preserve and protect the decorative layer. In order to improve the optical and haptical appearance of the decorative pattern of the decorative layer, impressions can be realized in the transparent layer, this in order to obtain an e.g., imitation of wood pores and other unevennesses which can be present at the surface of real wood. With the known panels, this is performed by simply providing a series of impressions in the floor panels, which impressions substantially extend according to one and the same direction. Notwithstanding the use of such impressions, also known as embossing, the known panels show the disadvantage that the imitation effect still is not optimum. So, for example, they show the disadvantage that if one looks at such floor panels at a relatively small angle, a light refraction at the transparent layer of synthetic matter is created, as a result of which only a glossy surface can be seen, without any visible effect of the actual print being perceived.

It is an object of the invention to provide an improved panel having an improved embossing effect.

SUMMARY OF THE INVENTION

This object can be achieved by providing a panel, comprising: a core provided with an upper side and a lower side, a decorative top structure affixed, directly or indirectly, on said upper side of the core, said decorative top structure comprising: at least one decorative print layer forming at least one décor image, a substantially transparent or translucent three-dimensional embossing structure at least partially covering said print layer, wherein the embossing structure is a multi-layer embossing structure which comprises: at least one, at least partially cured base layer provided with a plurality of indentations, and at least one at least partially cured elevated pattern layer formed by a plurality of elevations printed on top of said base layer.

The panel according to invention comprises a multi-layer embossing structure which comprises at least one negative embossing layer, wherein indentations (recesses) are applied in a base layer, and at least one positive embossing layer, wherein elevations (protrusions) are provided on top of said negative embossing layer. This results in a more pronounced (rough and hilly) embossing structure, wherein relatively deep embossings may be created, which leads to a more realistic appearance of the panel as such. Due to the relatively deep embossings which may be created by applying the multi-level layered embossing structure, a more realistic light effect as well as a better depth effect can be obtained, wherein the colours of the décor image are typically better perceptible. Typically, an upper side of the base layer defines an embossing base level, and wherein the indentations and at least a part and/or at least a number of the elevations are situated at opposite sides of said embossing base level. It is also imaginable that the indentations and at least a part and/or at least a number of the elevations are situated at the same side of said base level.

Typically, a part of the base layer is provided with said plurality of indentations, and wherein another part of the base layer is free of indentations. Hence, in this embodiment, the base layer is merely partially embossed. The elevations, of at least a part thereof and/or a number thereof, are preferably printed on the part of the base layer which is free of indentations, which leads to an increased depth effect of the embossing structure as such.

It is imaginable that the plurality of indentations of the base layer forms a discontinuous and/or a continuous indentation pattern. It is also imaginable that the plurality of indentations of the base layers forms a regular indentation pattern. Typically, the indentation pattern to be realized is strongly, or even completely, dependent on at least one décor image of the decorative layer.

Preferably, the base layer is a printed base layer. This means that the base layer, initially in liquid state, is printed either directly or indirectly on top of the decorative layer. One or more indentations may be provided in the base layer when the base layer is still in liquid state and/or one or more indentations may be provided in the base layer during and/or after curing (solidifying) the base layer. Providing one or more indentations in the liquid base layer is preferably done by means of chemically embossing. To this end, preferably (small) droplets of an embossing liquid are position-selectively printed (sprayed) onto the liquid base layer to cause a chemical reaction between the material of the printed droplets and the still liquid base layer, wherein the subsequent reaction product changes the structure at this location of the base layer optically and/or haptically. Providing one or more indentations in the base layer during or after curing may be done by either chemical embossing (as described above) and/or by mechanical embossing e.g. by using a laser or particle beam, such as a water beam.

Preferably, the indentations provided in the base layer have a depth situated in between 2 micron and 100 micron, preferably situated in between 3 micron and 50 micron. Preferably, the elevations of the elevated pattern layer have a height situated in between 2 micron and 500 micron, preferably situated in between 3 micron and 300 micron. The total embossing depth is determined by the sum of the greatest indentation depth and the greatest elevation height. In case a plurality of base layers and/or a plurality of elevated pattern layers is applied, an increase of the total embossing depth can be achieved.

In a preferred embodiment, at least a part of the indentations of the base layer is aligned in register with at least a part of at least one decor image formed by the decorative print layer. Preferably, at least a part of the elevations of the elevated pattern layer is aligned in register with at least a part of at least one decor image formed by the decorative print layer. By applying an alignment in register, also referred to as embossing in register, a very realistic and/or artistic design and appearance of the panel can be realized. The décor image may be formed by a wood pattern. However, it is well thinkable that the décor image represents another kind of pattern, such as, for example, a customized picture and/or a mosaic pattern or tile pattern. In case of a mosaic pattern or tile pattern, artificial tiles may be depicted which are aesthetically separated by one or more grouts. Here, the embossing structure applied may comprise a base layer having thicker layer parts covering the artificial tiles and thinner layer parts covering to one or more grouts. Here, it is also imaginable that elevations of the elevated pattern are predominantly or merely covering the artificial tiles and less or not at all the artificial tiles. In this manner, a realistic surface relief can be realized which is practically equal to the surface relief obtained when using real tiles and grouts.

It is imaginable that at least one additional decorative print layer is situated in at least one base layer and at least one elevated pattern layer. In this manner a multi-layer decorative pattern can be realized. This further increases the freedom of design of creating an decorative top structure including the embossing structure and the plurality of decorative layers, and this, for example, also allows to create a three-dimensional effect to the overall décor image(s). It is also imaginable that a coloured coating is provided in the indentations and onto the base layer. This coloured coating may be considered as additional decorative print layer.

Preferably, the grammage of the base layer is at least 40 g/m², preferably at least 50 g/m². Typically, the base layer is made of a radiation-curing material. Preferably, the base layer, at least in the initial liquid state, is made of at least one resin selected from the group consisting of: epoxy acrylates, polyester acrylates, polyether acrylates, amino acrylates, silicone acrylates, urethane acrylates, polyisoprene acrylates, polybutadiene acrylates and acrylate monomers. The term acrylates, also referred to as acrylic resin, includes both acrylate resins and methacrylate resins. The previously described resins are associated in that they polymerize and harden by virtue of the electromagnetic energy irradiated by e.g. a laser, typically a UV laser, an infrared source, and/or a mercury (Hg) light source. In a preferred embodiment, (meth)acrylate resin has a high solid content, for example equal to 20-30% by weight with respect to the weight of the resin, which typically leads to a desired volume increase of the base layer. Optionally, the base layer may comprise one or more photo-initiators to facilitate curing of the base layer. The (transparent and/or translucent) base layer may comprise fillers, such as (i) aluminium oxide, to increase the abrasion resistance thereof, (ii) talc to modify the rheology thereof, (iii) silica to reduce the brilliance thereof, calcium carbonate and/or (iv) other additives, such as rheology modifiers, and/or colorants. Optionally, the base layer may comprise silicones which are capable of increasing the depth of the embossing. Typically, silicones are added in an amount of 0.01-20% by weight of the base layer, preferably in an amount of 0.01% to 10%, more preferably in an amount of 0.01% to 2% by weight of the base layer. Suitable silicones include, for example, silicones, silicone polyethers, silicone acrylates, and silicone polyether acrylates.

Preferably, the base layer, at least in the initial liquid state, comprises propylidynetrimethanol, ethoxylated, esters with acrylic acid, and preferably also N-ethylamine, more preferably N-ethylethanamine. These products typically react with each other leading to an amine modified acrylic oligomer which can be polymerised by free radicals. And this latter property is used for radiation-curing of the base layer.

The base layer, at least in the initial liquid state, preferably comprises an epoxy acrylate oligomer, more preferably bisphenol A epoxy diacrylate. Bisphenol A epoxy diacrylate is a colourless liquid. This epoxy acrylate oligomer provides high gloss, imparts excellent reactivity and features outstanding chemical and mechanical fastness properties for the radiation-curable base layer.

Preferably, the base layer, at least in liquid state, comprises at least diacrylate, preferably at least one diacrylate chosen from the group consisting of: tricyclodecanedimethanol diacrylate; 1,6-hexanediol diacrylate; hexamethylene diacrylate; oxybis(methyl-2,1-ethanediyl) diacrylate; and 3-methyl 1,5-pentanediol diacrylate. These di-functional acrylic monomers are very reactive and are typically printed and/or sprayed, as embossing liquid (embossing ink), onto the original based layer (in liquid state) in order to create, position-selectively, indentations in the base layer. Droplets of this embossing ink can be applied onto the base layer in a very accurate manner, typically with a resolution of approximately 500-1,000 dpi (or more).

The grammage of the elevated pattern layer is at least 60 g/m², preferably at least 70 g/m². The grammage of the elevated pattern layer is preferably higher than the grammage of the base layer. The elevated pattern layer preferably comprises acrylic resin. More preferably, the elevated pattern layer, at least in liquid state, comprises biacrylate, preferably tripropylene glycol biacrylate. The elevated pattern layer can be printed and/or sprayed, position-selectively, onto the base layer. This printing process is preferably also executed in a very accurate manner, typically with a resolution of approximately 500-1,000 dpi (or more).

The embossing structure is preferably at least partially covered by a lacquer layer (wear layer). The lacquer layer can comprise any suitable known abrasion-resistant material, such as an abrasion-resistant macromolecular material coated onto the layer beneath it, or a known ceramic bead coating. If the wear layer is furnished in layer form, it can be bonded to the layer beneath it. The wear layer can also comprise an organic polymer layer and/or inorganic material layer, such as an ultraviolet coating or a combination of another organic polymer layer and an ultraviolet coating. For example, an ultraviolet paint capable of improving the surface scratch resistance, glossiness, antimicrobial resistance and other properties of the product. Other organic polymers including polyvinyl chloride resins or other polymers such as vinyl resins, and a suitable amount of plasticizing agent and other processing additives can be included, as needed. In an embodiment of a panel according to the invention, at least at least a part of the indentations of the base layer is left uncovered by the lacquer layer. In this manner, a further embossing effect (relief effect) can be achieved, and, moreover, glossy and matt areas may be created in this manner, which may further contribute to a desired aesthetical appearance of the panel as such. Here, for example, in case the décor image is formed by artificial tiles separated by grouts, the artificial tiles may be covered by the lacquer layer to provide these tiles a glossy effect, while the grouts are left substantially uncovered by the lacquer layer to maintain a more matt appearance.

It is imaginable that at least a part of at least one decorative layer is printed, preferably digitally printed, directly onto the upper side of the core. It is also imaginable that the upper side of the core is provided with at least one carrier layer, preferably formed by at least one primer or a film, wherein at least a part of the decorative layer is printed, preferably digitally printed, directly onto the carrier layer. The carrier layer can be affixed directly or indirectly (via one or more intermediate layers) onto the core. In case a primer is applied, then it is imaginable to apply at least two different primers, such as a glossy primer and a matt primer, which are position-selectively applied, side by side (adjacently), onto the core, preferably aligned in register with the decorative print layer to be applied on top of said primers. Also in this manner, a glossy effect and a matt effect can be realized at position-selective locations which can further contribute to a desired, realistic and/or artificial look (and feel) of the panel as such.

In an embodiment of the panel according to the invention, in between the printed decorative layer and the embossing structure at least one intermediate layer is situated. This intermediate layer is normally transparent, preferably very transparent, and/or translucent. Preferably, at least one intermediate layer is formed by a transparent or translucent, light-reflective thermoplastic layer, preferably a polyester layer, more preferably a polyethylene terephthalate layer (PET layer). This light-reflective thermoplastic layer acts as protective layer to protect the décor image against degradation due to exposure to daylight (or artificial light). Moreover, this light-reflective thermoplastic layer also prevents heating of the panel due to exposure to daylight (or artificial light) and therefore counteracts thermal action (expansion and shrinkage), which is in favour of the durability and reliability of both the panel as such and a floor covering consisting of a plurality of, preferably mutually coupled, panels. The light-reflective thermoplastic layer is preferably glued onto the printed decorative layer, more preferably by using a hot melt glue. The base layer may be applied directly on top of the light-reflective thermoplastic layer.

Typically, a backing layer is affixed to a lower side of the core. Non-limiting examples of materials whereof the backing layer can be made of are polyethylene, cork, polyurethane and ethylene-vinyl acetate. The thickness of a polyethylene backing layer is for example typically 2 mm or smaller. The backing layer commonly provides additional robustness and impact resistances to each tile as such, which increases the durability of the tiles. Moreover, the (flexible) backing layer may increase the acoustic (sound-dampening) properties of the tiles.

In a preferred embodiment, a first panel edge comprises a first coupling profile, and a second panel edge, preferably opposite to the first panel edge, comprising a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering movement (fold-down movement). In case the panel is rectangular, then the first panel edge and second panel edge are typically situated at opposite short edges of the panel. The panel preferably also comprises at least one third coupling profile and at least one fourth coupling profile located respectively at a third panel edge and a fourth panel edge, wherein the third coupling profile comprises: a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises: a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement (angling down movement), wherein, in coupled condition: at least a part of the sideward tongue of a first panel is inserted into the third groove of an adjacent, second panel, and wherein at least a part of the upward locking element of said second panel is inserted into the second downward groove of said first panel.

The core may be flexible, semi-rigid or substantially rigid. The core may be solid or at least partially foamed. The core may comprise at least one polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), Polyisocyanurate (PIR), or mixtures thereof. The core may comprise at least one wood-based material. The core may comprise at least one composite material of at least one polymeric material and at least one non-polymeric material. The at least one non-polymeric material is preferably selected from the group consisting of: talc, chalk, wood, calcium carbonate, and a mineral filler. The core may comprise magnesium oxide and/or magnesium hydroxide. The upper side of the core is preferably substantially flat.

The invention also relates to a panel covering, in particular floor covering, ceiling covering, or wall covering, consisting of a plurality of, preferably mutually coupled, panels according to the invention. Here, it is imaginable that at least two panels have a distinctive décor image, wherein each décor image represents a partial image, and wherein the combination of said décor images together form a single image (picture or photo).

The invention further relates to a method of producing a decorative panel according to the invention, comprising the steps of: A) forming at least one décor image onto the upper side of the core by means of printing, preferably digital printing, B) applying a liquid base layer on at least a part of at least one décor image formed during step A), C) position-selectively printing of a plurality of embossing droplets on the still liquid base layer in a manner, that the thickness of the base layer changes on the positions where the embossing droplets are spayed on, such that at these positions indentations are formed in the liquid base layer, D) at least partially curing said base layer provided with said indentations, E) position-selectively printing an elevated pattern layer formed by a plurality elevations on said base layer, preferably said base layer which is at least partially cured during step D), and F) at least partially curing said pattern layer.

Advantages and embodiments of the panel have been discussed above already in an extensive manner. During step C) the embossing droplets are preferably printed onto the liquid base layer according to a first digital template, which is aligned in register with at least a part of at least one décor image formed during step A). During step E) the elevated pattern is preferably printed onto the base layer according to a second digital template, which is aligned in register with at least a part of at least one décor image formed during step A). More preferably, the first digital template differs from the second digital template. Preferably, curing of the base layer according to step D) and/or curing of the pattern layer according to step F) is performed of radiation curing, preferably by means of UV radiation and/or electron radiation and/or IR radiation.

BRIEF DESCRIPTION OF THE DRAWINGS

The invention will be elucidated on the basis of non-limitative exemplary embodiments shown in the following figures.

FIG. 2b shows a top view of the panel (220) shown in FIG. 2a;

DESCRIPTION OF THE INVENTION

Figure 1A:
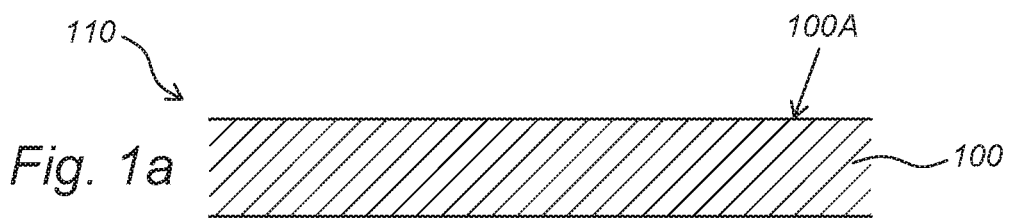
FIGS. 1a-1e show subsequent steps of a method according to the present invention.
Figure 1B:
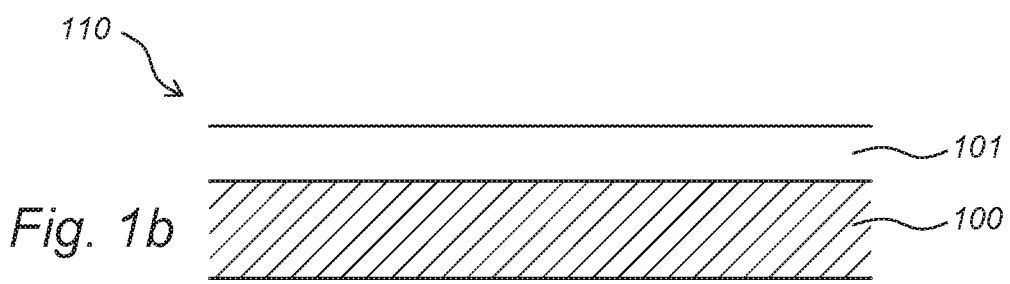
Figure 1C:
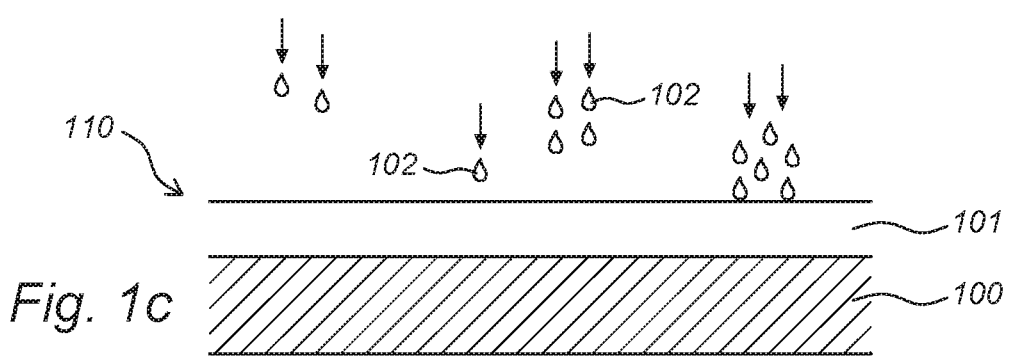
Figure 1D:
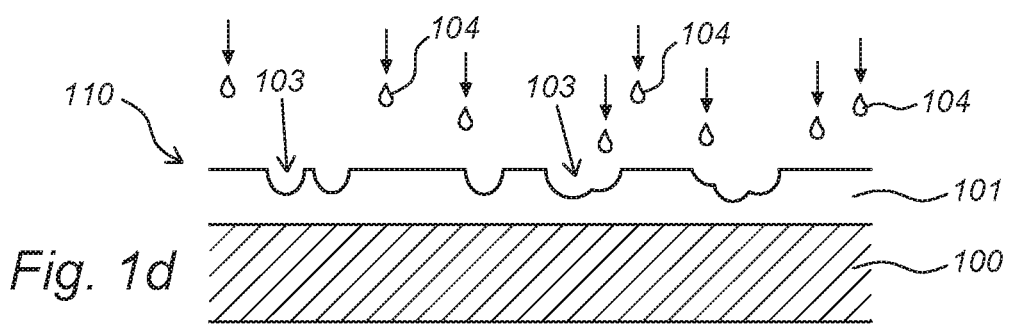
Figure 1E:
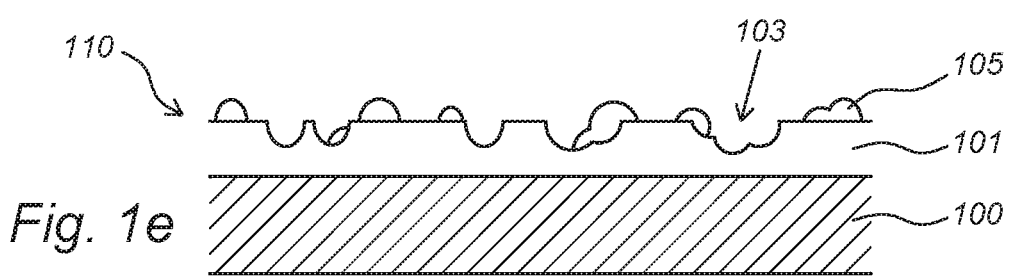

FIGS. 1a-1e show subsequent steps of a method according to the present invention. FIG. 1a shows a schematic representation of a cross section of a decorative panel (110). The figure shows the core (100) of the panel (110). The core (100) is typically substantially rigid, and may possibly comprises at least one polymer and/or at least one wood-based material. A décor image is formed onto the upper side (100A) of the core (100) by means of printing, in particular digital printing. FIG. 1b show that a liquid base layer (101) is applied on the décor image formed at the upper side (100A) of the panel (110). The liquid forming the liquid base layer (101) is for example a UV sealer. The liquid base layer (101) generally has a relatively high surface tension in order to allow precise embossing in the liquid base layer (101). FIG. 1c show that a plurality of embossing droplets (102) is position-selectively printed on the still liquid base layer (101). This is done such that the thickness of the base layer (101) changes on the positions where the embossing droplets (102) are spayed on. FIG. 1d shows that this results in that positions indentations (103) are formed in the liquid base layer (101) at the positions where the embossing droplets (102) are sprayed on. The base layer (101) is at least partially cured after the base layer (101) is provided with said indentations (103). Subsequently an elevated pattern layer is formed by position-selectively printing of a plurality elevations on the base layer (101). The elevation droplets (104) applied onto the panel (110) are shown in FIG. 1d. The pattern layer obtained via the position-selectively printing of the elevations (105) is subsequently at least partially cured. Preferably, the embossing droplets (102) and/or the elevation droplets (104) have a surface tension which is higher than the surface tension of the liquid base layer (101). Optionally, one or more finishing layers (not shown) can be applied to the panel (110). Via the steps shown in FIGS. 1a-1e, a decorative panel (110) is obtained, comprising a core (100) and a decorative top structure affixed on the upper side (100A) of the core (100). The decorative top structure comprises a decorative print layer forming at least one décor image and a substantially transparent or translucent three-dimensional embossing structure at least partially covering said print layer. The embossing structure is a multi-layer embossing structure which comprises a base layer (101) provided with a plurality of indentations (103) and an elevated pattern layer formed by a plurality of elevations (105) printed on top of said base layer (101).

It can be seen that the indentations (103) and the elevations (105) can overlap, such that a panel (110) having an irregular height structure is obtained. The plurality of indentations (103) of the base layer (101) forms a discontinuous indentation pattern. The panel (110) may possibly comprise multiple coupling profiles for coupling multiple panels (110). The panel (110) may also comprise a backing layer (not shown) affixed to a lower side of the core (100).

Figure 2A:
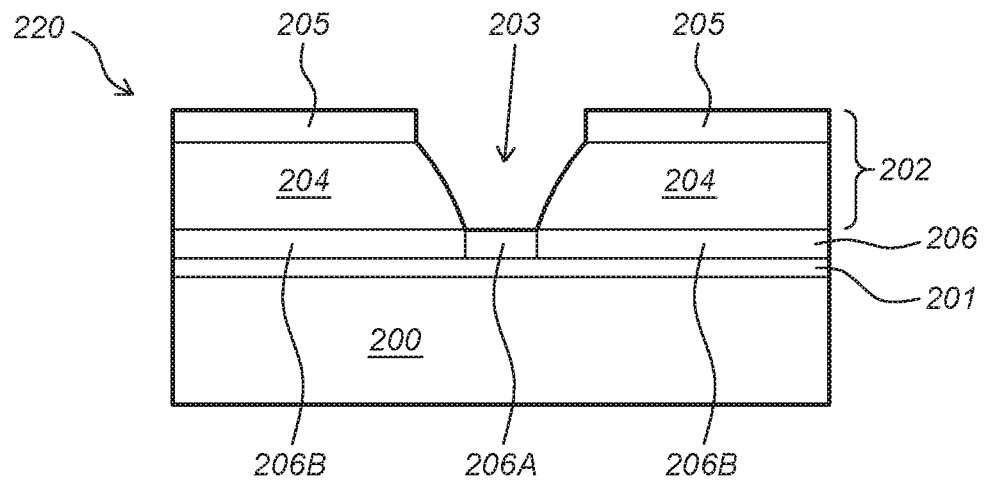
FIG. 2a shows a schematic representation of another example of a decorative panel (220) according to the present invention.

FIG. 2a shows a schematic representation of another example of a decorative panel (220) according to the present invention. The panel (220) comprises a core (200) provided with an upper side and a lower side, and a decorative top structure (201) affixed, directly or indirectly, on said upper side of the core (200). The decorative top structure (201) comprises a decorative print layer forming at least one décor image. The panel (220) also comprises a substantially transparent or translucent three-dimensional embossing structure (202) covering said print layer (201). In the shown embodiment comprises the embossing structure (202) a base layer (204) provided with a plurality of indentations (203), and an elevated pattern layer formed by a plurality of elevations (205) printed on top of said base layer (204). The elevations form part of a lacquer layer (205). A carrier layer (206), and in particular a primer layer (206) is present enclosed between the top structure (201) and the embossing structure (202). In the shown embodiment, the primer layer (206) comprises a pattern of mat primer (206A) and glossy primer (206B). The indentations (203) are present where the primer layer (206) is provided with mat primer (206A). The structured elevations (205) cover the glossy primer (206B) of the primer layer (206). Due to the embossing structure (202) being substantially transparent, the differences within the primer layer (206) are visible. It is also conceivable that the primer layer (206) is attached onto the upper side of the core (200), and that the decorative top structure (201) is attached onto the primer layer (206).

Figure 2B:
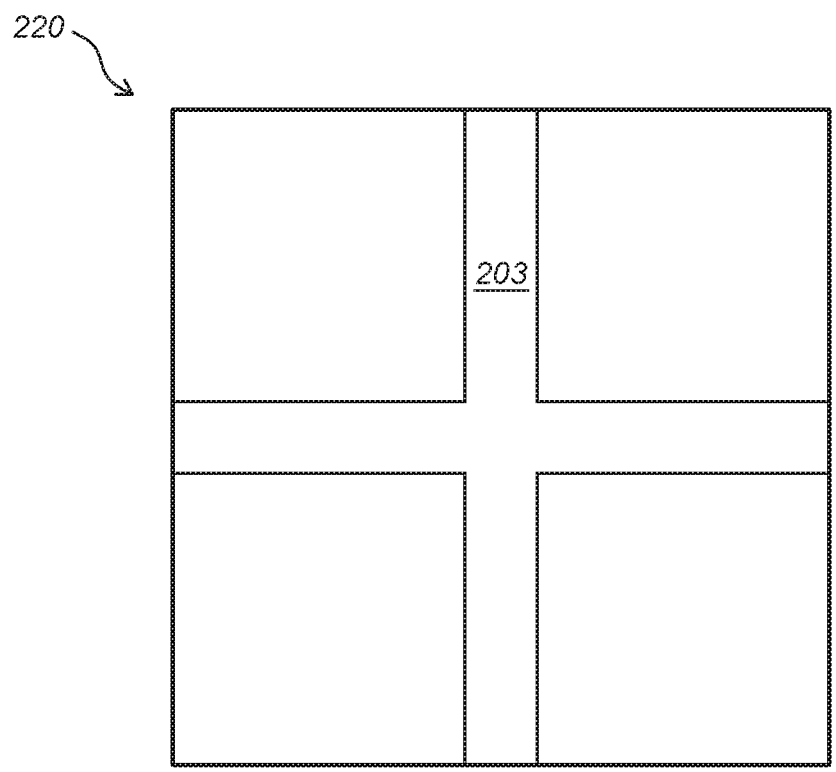

FIG. 2b shows a top view of the panel (220) shown in FIG. 2a. It can be seen that due to a part of the base layer being provided with said plurality of indentations (203) and part of the base layer being free of indentations a visually observable pattern is obtained. This effect is further reinforced by the primer layer (206) comprising both mat and glossy primer (206A, 206B) in a pattern which is in line with the embossing structure (202).

Figure 3:
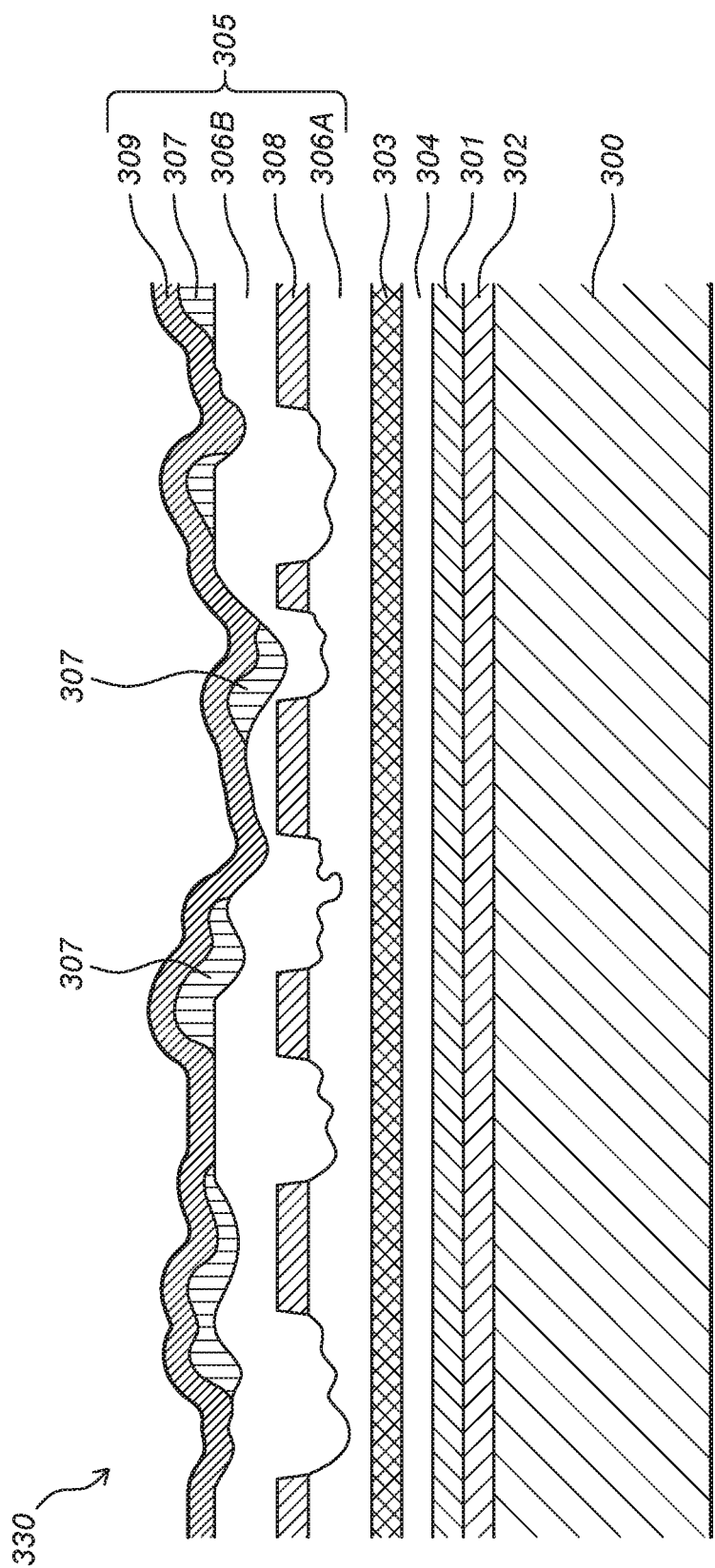
FIG. 3 shows a schematic representation of a further example of a decorative panel (330) according to the present invention.

FIG. 3 shows a schematic representation of a further example of a decorative panel (330) according to the present invention. The figure shows a cross section of a decorative panel (330), in particular a floor panel (330). The panel (330) comprises a core (300) provided with an upper side and a lower side. A decorative print layer (301) is indirectly affixed on the upper side of the core (300). A carrier layer (302) formed by a primer (302) is present in between the core (300) and the decorative layer (301) in order to provide better adhesion of the decorative layer (301). An intermediate layer (303) is present on top of the printed decorative top layer (301). The intermediate layer (303) is formed by a transparent or translucent, light-reflective thermoplastic layer (303). The light-reflective thermoplastic layer (303) is glued onto the printed decorative layer (301) by means of a hot melt glue layer (304). A substantially transparent or translucent three-dimensional embossing structure (305) is positioned on top op of aforementioned layers (300, 301, 302, 303, 304). The embossing structure (305) is a multi-layer embossing structure (305) which comprises two at least partially cured base layers (306A, 306B) provided with a plurality of indentations. A part of each base layer (306A, 306B) is free of indentations. The embossing structure (305)

also comprises an elevated pattern layer (307) formed by a plurality of elevations printed on top of the upper base layer (306B). The elevations are both printed on parts of the base layer (306B) that respectively provided with indentations and parts that are free of indentations. Despite not shown, it is also conceivable that an embossing layer is present on top of the lower base layer (306A). A secondary printed decorated layer (308) is affixed to the lower base layer (306A). This printed decorative layer (308) is affixed to the parts of the base layer (306A) which is free of indentations. The entire panel (330) is covered with a finishing layer (309), in particular a lacquer layer (309). The panel (330) benefits of the presence of two printed decorative layers (301, 308), resulting in that a unique visual pattern can be obtained. The indentations provided in the base layer (306A, 306B) typically have a depth situated in between 2 micron and 100 micron, preferably situated in between 3 micron and 50 micron. The elevations of the elevated pattern layer (307) typically have a height situated in between 2 micron and 500 micron, preferably situated in between 3 micron and 300 micron.

Figure 4A:
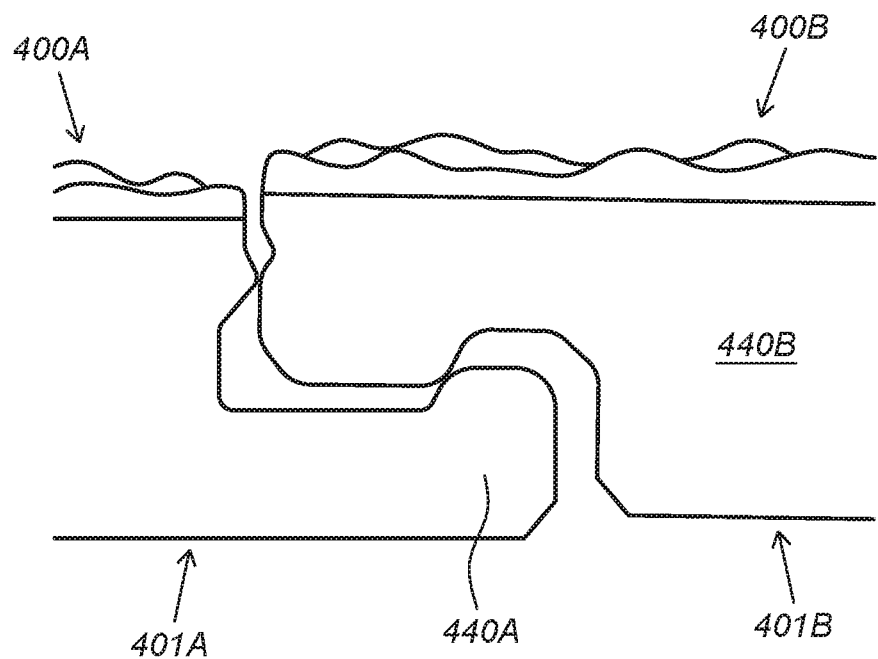
FIGS. 4a and 4b show non-limiting examples of coupling profiles (401A, 401B, 402A, 402B) used in panels (400A, 400B) according to the present invention.
Figure 4B:
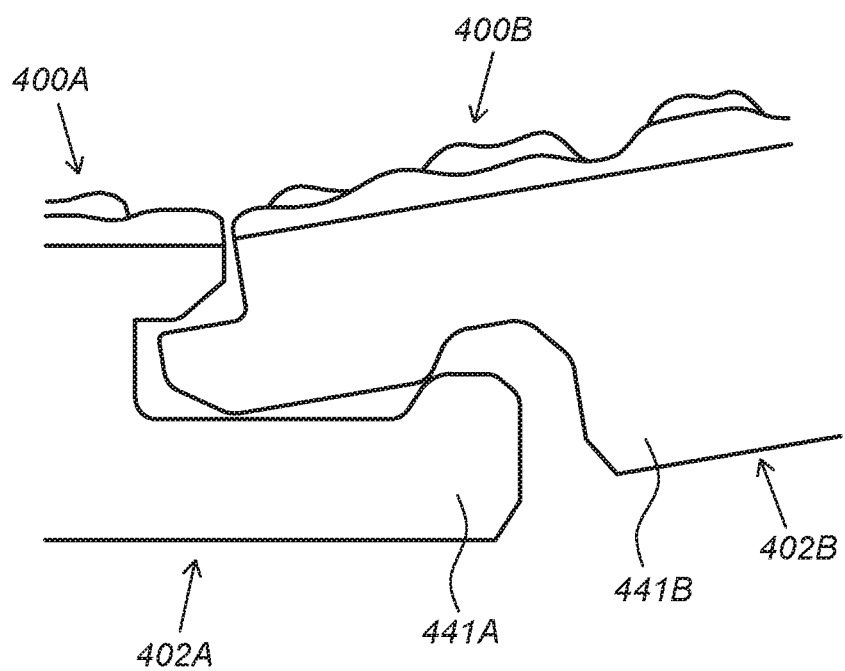

FIGS. 4a and 4b show non-limiting examples of coupling profiles (401A, 401B, 402A, 402B) used in panels (400A, 400B) according to the present invention. A first panel edge (440A) comprises a first coupling profile (401A), and a second panel edge (440B) opposite to the first panel edge (440A), comprising a second coupling profile (401B) being designed to engage interlockingly with said first coupling profile (401A) of an adjacent panel, both in horizontal direction and in vertical direction, wherein the first coupling profile (401A) and the second coupling profile (401B) are configured such that two of such panels can be coupled to each other by means of a lowering movement. This is shown in FIG. 4a. FIG. 4b show the panel comprising a third coupling profile (402A) and a coupling profile (402B) located respectively at a third panel edge (441A) and a fourth panel edge (441B). The third coupling profile (402A) and the fourth coupling profile (402B) are configured such that two of such panels (440A, 440B) can be coupled to each other by means of a turning movement, wherein, in coupled condition: at least a part of the sideward tongue of a first panel is inserted into the third groove of an adjacent, second panel, and wherein at least a part of an upward locking element of said second panel is inserted into the second downward groove of said first panel.

Hence, the above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel, in particular a floor panel, ceiling panel or wall panel, comprising:
   a core provided with an upper side and a lower side,
   a decorative top structure affixed, directly or indirectly, on said upper side of the core, said decorative top structure comprising:
   at least one decorative print layer forming at least one décor image,
   a substantially transparent or translucent three-dimensional embossing structure at least partially covering said print layer, wherein the embossing structure is a multi-layer embossing structure which comprises:
   at least one, at least partially cured base layer provided with a plurality of indentations, and
   at least one at least partially cured elevated pattern layer formed by a plurality of elevations printed on top of said base layer.

2. Panel according to claim 1, wherein an upper side of the base layer defines an embossing base level, and wherein the indentations and at least a part of the elevations are situated at opposite sides of said embossing base level.

3. Panel according to claim 1, wherein an upper side of the base layer defines a base level, and wherein the indentations and at least a part of the elevations are situated at the same side of said base level.

4. Panel according to claim 1, wherein a part of the base layer is provided with said plurality of indentations, and wherein another part of the base layer is free of indentations.

5. Panel according to claim 4, wherein at least a part of the elevations are printed on the part of the base layer which is free of indentations.

6. Panel according to claim 1, wherein the plurality of indentations of the base layer forms a discontinuous indentation pattern.

7. Panel according to claim 1, wherein the base layer is a printed base layer.

8. Panel according to claim 1, wherein the indentations provided in the base layer have a depth situated in between 2 micron and 100 micron, preferably situated in between 3 micron and 50 micron.

9. Panel according to claim 1, wherein the elevations of the elevated pattern layer have a height situated in between 2 micron and 500 micron, preferably situated in between 3 micron and 300 micron.

10. Panel according to claim 1, wherein at least a part of the indentations of the base layer is aligned in register with at least a part of at least one decor image formed by the decorative print layer.

11. Panel according to claim 1, wherein at least a part of the elevations of the elevated pattern layer is aligned in register with at least a part of at least one decor image formed by the decorative print layer.

12. Panel according to claim 1, wherein the at least one additional decorative print layer is situated in at least one base layer and at least one elevated pattern layer.

13. Panel according to claim 1, wherein a coloured coating is provided in the indentations and onto the base layer.

14. Panel according to claim 1, wherein at least a part of the indentations are chemically embossed indentations.

15. Panel according to claim 1, wherein the grammage of the base layer is at least 40 g/m$^2$, preferably at least 50 g/m$^2$.

16. Panel according to claim 1, wherein the base layer comprises acrylic resin.

17. Panel according to claim 16, wherein the base layer comprises propylidynetrimethanol, ethoxylated, esters with acrylic acid.

18. Panel according to claim 17, wherein the base layer comprises at least one epoxy acrylate oligomer.

19. Panel according to claim 16, wherein the base layer comprises at least diacrylate, preferably at least one diacrylate chosen from the group consisting of: tricyclodecanedimethanol diacrylate; 1,6-hexanediol diacrylate; and 3-methyl 1,5-pentanediol diacrylate.

20. Panel according to claim 1, wherein the grammage of the elevated pattern layer is at least 60 g/m$^2$, preferably at least 70 g/m$^2$.

21. Panel according to claim 1, wherein the elevated pattern layer comprises acrylic resin.

22. Panel according to claim 21, wherein the elevated pattern layer comprises biacrylate, preferably tripropylene glycol biacrylate.

23. Panel according to claim 1, wherein the embossing structure is at least partially covered by a lacquer layer.

24. Panel according to claim 23, wherein at least at least a part of the indentations of the base layer is left uncovered by the lacquer layer.

25. Panel according to claim 1, wherein at least a part of the decorative layer is printed directly onto the upper side of the core.

26. Panel according to claim 1, wherein the upper side of the core is provided with a carrier layer, preferably formed by a primer or a film, wherein at least a part of the decorative layer is printed directly onto the carrier layer.

27. Panel according to claim 1, wherein in between the printed decorative layer and the embossing structure at least one intermediate layer is situated.

28. Panel according to claim 27, wherein at least one intermediate layer is formed by a transparent or translucent, light-reflective thermoplastic layer, preferably a polyester layer, more preferably a polyethylene terephthalate layer.

29. Panel according to claim 28, wherein said light-reflective thermoplastic layer is glued onto the printed decorative layer.

30. Panel according to claim 29, wherein the base layer is applied directly on top of the light-reflective thermoplastic layer.

31. Panel according to claim 1, wherein a backing layer is affixed to a lower side of the core.

32. Panel according to claim 1, wherein a first panel edge comprises a first coupling profile, and a second panel edge, preferably opposite to the first panel edge, comprising a second coupling profile being designed to engage interlockingly with said first coupling profile of an adjacent panel, both in horizontal direction and in vertical direction, wherein the first coupling profile and the second coupling profile are preferably configured such that two of such panels can be coupled to each other by means of a lowering movement.

33. Panel according to claim 1, wherein the panel comprises at least one third coupling profile and at least one fourth coupling profile located respectively at a third panel edge and a fourth panel edge, wherein the third coupling profile comprises:
  a sideward tongue extending in a direction substantially parallel to the upper side of the core,
  at least one second downward flank lying at a distance from the sideward tongue, and
  a second downward groove formed between the sideward tongue and the second downward flank,
wherein the fourth coupling profile comprises:
  a third groove configured for accommodating at least a part of the sideward tongue of the third coupling profile of an adjacent panel, said third groove being defined by an upper lip and a lower lip, wherein said lower lip is provided with an upward locking element,
wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

34. Panel according to claim 1, wherein the core is substantially rigid.

35. Panel according to claim 1, wherein the core is at least partially foamed.

36. Panel according to claim 1, wherein the core comprises at least one polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), Polyisocyanurate (PIR), or mixtures thereof.

37. Panel according to claim 1, wherein the core comprises at least one wood-based material.

38. Panel according to claim 1, wherein the core comprises at least one composite material of at least one polymeric material and at least one non-polymeric material.

39. Panel according to claim 38, wherein at least one non-polymeric material is selected from the group consisting of: talc, chalk, wood, calcium carbonate, and a mineral filler.

40. Panel according to claim 1, wherein the core comprises magnesium oxide and/or magnesium hydroxide.

41. Panel according to claim 1, wherein the embossing substrate comprises a plurality of base layers and/or a plurality of elevated pattern layers.

42. Panel according to claim 1, wherein the upper side of the core is substantially flat.

43. A panel covering, in particular floor covering, ceiling covering, or wall covering, consisting of mutually coupled panels according to claim 1.

44. A method of producing a decorative panel, comprising the steps of:
  A) forming at least one décor image onto an upper side of a core by means of printing, preferably digital printing,
  B) applying a liquid base layer on at least a part of at least one décor image formed during step A),
  C) position-selectively printing of a plurality of embossing droplets on the still liquid base layer in a manner, that the thickness of the base layer changes on the positions where the embossing droplets are spayed on, such that at these positions indentations are formed in the liquid base layer,
  D) at least partially curing said base layer provided with said indentations,
  E) position-selectively printing an elevated pattern layer formed by a plurality elevations on said base layer, preferably said base layer which is at least partially cured during step D), and
  F) at least partially curing said pattern layer.

45. The method according to claim 44, wherein during step C) the embossing droplets are printed onto the liquid base layer according to a first digital template, which is aligned in register with at least a part of at least one décor image formed during step A).

46. The method according to claim 45, wherein during step E) the elevated pattern is printed onto the base layer according to a second digital template, which is aligned in register with at least a part of at least one décor image formed during step A).

47. The method according to claim 46, wherein the first digital template differs from the second digital template.

48. The method according to claim 44, wherein curing of the base layer according to step D) and/or curing of the pattern layer according to step F) is performed of radiation curing, preferably by means of UV radiation and/or electron radiation and/or IR radiation.

\* \* \* \* \*

UNITED STATES PATENT AND TRADEMARK OFFICE
CERTIFICATE OF CORRECTION

PATENT NO. : 10,895,079 B2
APPLICATION NO. : 16/392909
DATED : January 19, 2021
INVENTOR(S) : Lin Li Page 1 of 1

It is certified that error appears in the above-identified patent and that said Letters Patent is hereby corrected as shown below:

On the Title Page

Column 1, Prior Publication Data, Line 3, Below "2020" insert -- Foreign Application Priority Data Apr. 11, 2019 (NL) ........ 2022925 --

In the Claims

Column 11, Line 16, Claim 24, delete "at least at least" and insert -- at least --

Column 12, Line 46, Claim 44, delete "spayed" and insert -- sprayed --

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*